Patented Dec. 26, 1939

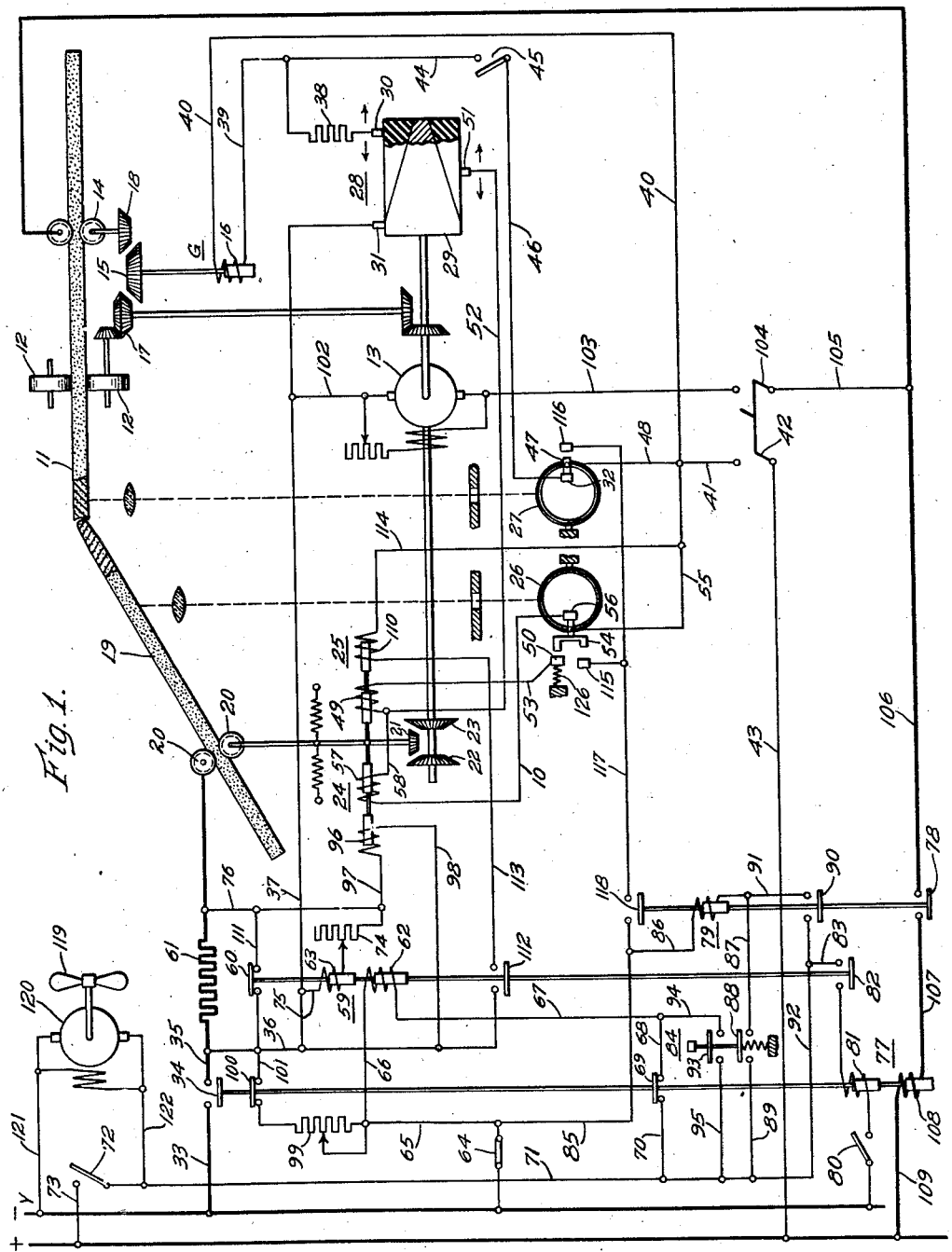

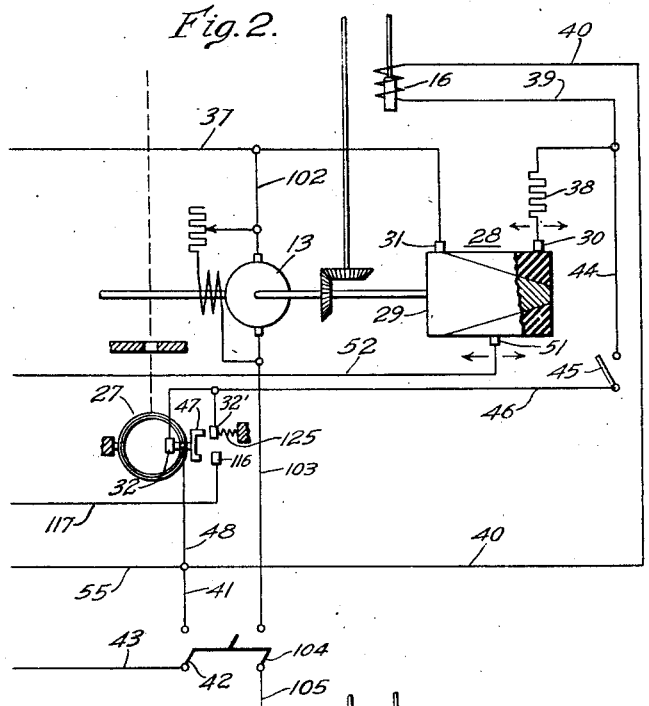
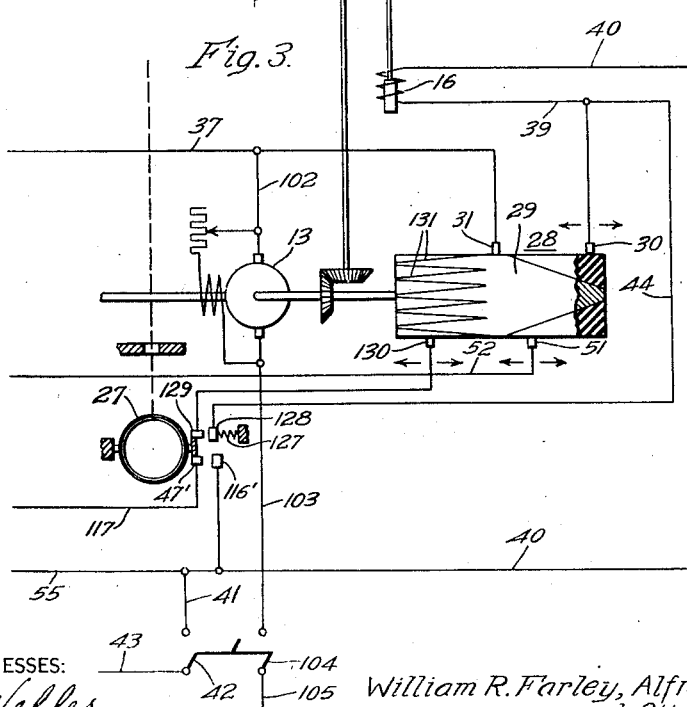

2,184,765

UNITED STATES PATENT OFFICE 2,184,765

ELECTRODE CONTROL FOR SEARCHLIGHTS

William R. Farley, Wilkinsburg, Pa., Alfred L. Atherton, Longmeadow, Mass., and Otto Gonano, East Pittsburgh, Pa., assignors to Westinghouse Electric & Manufacturing Company, East Pittsburgh, Pa., a corporation of Pennsylvania Application June 19, 1937, Serial No. 149,164

19 Claims. (Cl. 176—75)

Our invention relates in particular to arc searchlights, such as those used for aircraft observation, where provisions are required for the automatic striking of the arc and for the automatic positioning of the electrodes, so as to hold the useful portion of the arc at a predetermined point with respect to the reflector of the searchlight, and the maintenance of constant current through and/or constant voltage across the arc.

In the operation of arc searchlights, it is customary to strike the arc by moving the energized negative electrode to make contact with the positive electrode, then drawing the negative electrode back from the positive electrode thereby drawing the arc out. This method entails a considerable time delay due to the necessity of moving the negative electrode from the position occupied when last the arc was deenergized to the engaged position before the arc can be struck. For uses, such as aircraft observation, it is necessary to strike the arc very quickly. For example, in the usual system of sighting aircraft in flight at night, the approximate location of the aircraft is determined by a sound detector which is sensitive to the direction of the sound source and the searchlight is made to follow the movement of the sound detector or sound detector direction indicating means. When the location of the aircraft is thus determined, the searchlight is "flashed" or energized to illuminate the aircraft so that it may be seen by an observer. Because of the difficulty in accurately keeping the location of aircraft travelling at high speed, it is desirable that the searchlight be made to project a beam toward the aircraft as soon as possible after the location is determined. For this reason it is necessary that the searchlight arc be capable of being struck very quickly.

We have found it necessary, in the operation of arc searchlights, that the arc length and in addition, that the arc current and/or voltage, be maintained at such predetermined values as have been found to give the maximum light output. It is further necessary that the useful portion of the arc be maintained at a predetermined position, at or near the focus of the searchlight reflector. Because of the rapid consumption of the electrodes in the arc, it is necessary that means be provided either for continually feeding them to the arc at a predetermined rate depending on the rate of consumption, or that means be provided for feeding them when they have been consumed to such an extent as to vary the arc length, arc current, arc voltage or the position of the arc with respect to the focal position of the reflector by more than a predetermined amount.

Further while a searchlight arc is in operation, if for any reason the feeding mechanism should stop, incorrectly function, or the electrode should be consumed to such an extent as to become too short to be engaged by the feeding mechanism, the arc may either be extinguished due to too great an increase in arc length, or the position of the arc may recede to a point where the arc would be sufficiently close to the electrode holder to allow such holder to be damaged by heat from the arc.

The feed of the positive electrode to the arc has been accomplished by a combined constant feed and supplementary thermostatically controlled feed mechanism responsive to positive electrode tip position. Such a mechanism is described in the copending application of W. H. Jacobi and I. A. Yost, Serial No. 43,372 filed October 3, 1935, now Patent No. 2,117,888, issued May 17, 1938 and entitled "Electrode feeding mechanism for searchlights". In such mechanisms and in systems in which the positive electrode position is governed by thermostatic means alone, it has been found that, upon striking the arc after a shut-down or after recarboning, there is a tendency for the first thermostatically initiated advance of the positive electrode to be excessive. This results in a tendency in the positioning of the tip of the positive carbon beyond the focal point or other predetermined desired position. This excessive initial advance appears to be due to the fact that the thermostat has more time lag when comparatively cool than when it has been affected by heat from the arc, after the arc has been burning for some time and the thermostat has become comparatively hot. One object of our invention is to provide means for obviating the hereinbefore described objectionable feature.

In past practice, the positioning of the negative electrode has been controlled by means responsive to either the voltage across the arc, or the current through the arc. Thus, for example, in accordance with such practice, if the current through the arc should decrease below a predetermined amount, due to the negative electrode position being too distant from the positive electrode position, means responsive to this decrease in current would cause the negative electrode to be advanced towards the positive electrode, until the arc current had again increased to the predetermined amount. Or alternatively, in the event of the use of a control means responsive to changes in voltage across the arc, an increase in voltage across the arc would also cause the negative electrode to be advanced toward the positive electrode until the predetermined arc voltage was again obtained. It has further been observed that with a given predetermined value of current through the arc, or voltage across the arc, the maximum light output is obtained with a predetermined length of arc or separation between the positive and negative electrodes. It has further been observed that the positioning of the negative electrode by means responsive either to current through the arc or voltage across the arc does not necessarily result in obtaining such predetermined and optimum arc length. One object of our invention is to provide means for securing this optimum arc length as well as the predetermined value of current through or voltage across the arc to obviate the hereinbefore described objectionable feature.

An object of our invention is to provide a means whereby when an arc is deenergized for shut-down or to change electrodes, the electrodes may be made to engage and remain in the engaged position so that, when it is again desired to strike the arc, the arc may be struck quickly by merely energizing the electrodes and moving the electrodes apart.

Another object of our invention is to provide a device which shall operate to form an arc when the device is actuated and which may be operated to deenergize the arc and move the electrode into position for re-forming the arc.

A further object of our invention is to provide a means for selectively moving one electrode of an arc toward and away from the other electrode and a control system which shall cause said means to move the one electrode to engage the other electrode when the arc is deenergized and which shall cause said means to separate the electrodes to draw the arc when the electrodes are energized.

Another object of our invention is to provide a device which may be actuated to move an electrode to strike an arc and which may be actuated to maintain the arcing tip of the electrode in a predetermined position.

Another object of our invention is to provide an electrode control mechanism for an arc searchlight which shall operate to maintain an arc at a predetermined length and in a predetermined position.

A further object of our invention is to provide an arc searchlight with an electrode control system which shall have a thermostatic control and which shall operate to minimize the effect of the difference in the time lag of the thermostatic control when the arc has just been struck and the thermostat is relatively cold and after the arc has been operating long enough to cause the thermostat to be relatively hot.

Another object of our invention is to provide a control system for the electrodes of an arc searchlight which shall operate to maintain a constant arc length, a constant arc current and/or voltage and a constant arc position.

A further object of our invention is to provide a control system for the electrodes of an arc searchlight which shall operate to feed the positive electrode to the arc at a continuous rate, which may be adjusted to the average rate of consumption of the electrode in the arc, and to supplement this continuous feed by a device which shall operate in response to the electrode arcing tip position to increase the rate of feed of the electrode an adjustable predetermined amount when the arcing tip has receded a predetermined amount.

Another object of our invention is to provide an arc searchlight with an electrode control system which shall operate to deenergize the electrodes in the event that either electrode tip recedes a predetermined amount.

Another object of our invention is to provide an arc searchlight with a control system which shall operate to strike the arc and place the searchlight into operation, which control system shall be rendered operative only after the ventilating means for the searchlight has been placed into operation.

These and other objects and advantages of our invention will be readily understood by reference to the following description taken in connection with the accompanying drawings, in which:

Figure 1 is a diagrammatic illustration of the operating elements and the connections thereto of the preferred embodiment of our invention; and Figs. 2 and 3 are diagrammatic illustrations of modifications of the mechanism and circuit connections for controlling the electrode feed illustrated in Fig. 1.

In carrying out our invention we have provided a relay device which may be selectively actuated to cause one of the electrodes of an arc searchlight to move toward and away from the other electrode. This selective relay is controlled in its operation by a relay system which causes the relay device to move the one electrode to and then retract it from the other electrode to strike the arc in the event that the searchlight is energized when the electrodes are separated or in the event that the arc is broken for any reason while the searchlight remains energized. This relay system also causes the one electrode to advance to contact the other electrode when the arc is deenergized so that the electrodes will be in striking position to insure a speedy striking of the arc when it is again desired to project a light beam.

Mechanism is provided to cooperate with the relay device to maintain the one electrode arcing tip in a predetermined position and the other electrode is continuously fed to the arc at a rate which may be varied and which is substantially the average rate of consumption of this electrode in the arc. A mechanism is provided for keeping this other electrode arcing tip in a predetermined position with respect to the focal point of the searchlight reflector. Thus, the searchlight is kept in focus and a predetermined arc length is maintained. This makes for a steady continuously focused beam of unvarying intensity.

A motor-operated ventilating fan is provided for circulating cooling air through the searchlight casing and the relay system is so connected as to permit striking of the arc only when the fan is energized. A door-operated switch is also provided to prevent injury to an operator who might be working on some mechanism within the searchlight drum with the searchlight door open. This switch renders the control system inoperative to strike an arc when the door is open.

Referring to Fig. 1 of the drawings, we have shown a system for feeding the electrodes of an arc searchlight to the arc at a rate substantially equal to the average rate of consumption of the electrodes in the arc, with control devices for maintaining the arc at a predetermined length, for striking an arc when the searchlight is first energized, for re-striking the arc if for any reason the arc is extinguished by pulling out or any other condition not controlled by the operator, and for advancing the negative carbon to touch the positive carbon when the control means is manipulated to deenergize the arc so that the carbons will be in a position to immediately restrike the arc when desired.

Specific means for maintaining a constant voltage across the arc and a constant current flow through the arc have not been shown since such devices are well known in the art and any device suitable for this purpose may be employed.

The positive electrode 11 is continuously rotated by rollers 12 which are actuated by gearing mechanism from motor 13 which rotates continuously. The feeding of electrode 11 toward the arc is accomplished by a clutch mechanism 15 which, when energized by coil 16, will establish connection between the gears 17 and 18 to actuate the feed roller 14.

Movement of negative electrode 19 toward and from the positive electrode is effected by rollers 20 which are actuated from gear 21 which may be selectively brought into engagement with either one of the gears 22 and 23 which are continuously rotated by a motor 13. The selective movement of gear 21 is effected by solenoids 24 and 25 which, when energized, cause movement of the negative electrode from and toward the positive electrode, respectively.

Each of solenoids 24 and 25 has two operating coils, one of which is connected in circuit for causing the movement of the negative electrode necessary to strike the arc and another coil which is connected in a system which will govern the position of the negative electrode tip while the arc is burning. Once the arc is struck, the position of the arc is governed by the contacts of thermostat 26 which is so positioned as to be exposed to the heat rays from the end or near the end of the negative electrode and which will be actuated to close its contacts when the end of the negative electrode recedes to a predetermined position. The positioning of the end of the positive electrode is likewise governed by a thermostat 27 which is so positioned as to be affected by the heat rays at or near the end of the positive carbon and to close its contacts in accordance with the position of the arcing tip or crater of the positive electrode. These thermostatic devices may be of any well known type of construction, but are preferably such thermostatic elements as those disclosed in the copending application of P. H. Brace et al., Serial No. 130,740, filed March 13, 1937, now Patent No. 2,162,524, issued June 13, 1939.

The complete control system for the intermittent feed of the positive electrode 11 includes a contactor drum 28 which is continuously rotated by motor 13 and which has on its surface a triangular conducting element 29. An adjustable brush 30 bears on the drum and may be moved axially to secure different lengths of time of contact between brush 30 and conducting element 29 in each revolution of the drum 28. A fixed brush 31 is provided to supply potential to element 29 from the feed line Y. This interrupter arrangement causes intermittent energization of solenoid 16 which, in turn, causes forward movement of positive electrode 11 at a rate which is governed by the adjustment of brush 30. A circuit which includes the back contact 32 of thermostatic switch 27 is provided which shorts out solenoid coil 16 and, therefore, prevents its energization except when the electrode tip is in such a position and is at such a temperature as to cause thermostatic switch 27 to open its back contact element. By this arrangement no feeding of the positive electrode 11 is permitted until the electrode has become heated up after the initial striking of the arc.

The complete circuit for causing this feeding of the positive electrode extends from the supply conductor Y, through conductor 33, contact element 34, conductors 35, 36, and 37, brush 31, contact strip 29, brush 30, resistance 38, conductor 39, solenoid 16, conductors 40 and 41, switch 42 and conductor 43 to the supply conductor X. The shunting circuit for the feed solenoid 16 includes conductor 44, manual control switch 45, conductor 46, back contact element 32, movable contact element 47 and conductor 48. By means of switch 45, this thermostatic control of the solenoid may be made operative by connecting conductors 44 and 46 or may be made inoperative by opening the switch 45 to disconnect these conductors.

The system for controlling the regular feed of the negative electrode 19 toward the arc, when the arc is in normal operation to compensate for the consumption of the electrode in the arc, includes coil 49 of solenoid 25, front contact 50 of thermostatic switch 26, and an adjustable brush 51, on the contactor drum 28, which is axially movable to secure the desired time interval of energization of the solenoid coil 49. The complete circuit for causing this forward feed of the negative electrode extends from supply conductor Y, through conductor 33, contact element 34, conductors 35, 36 and 37, brush 31, contact 29, brush 51, conductor 52, coil 49, conductor 53, front contact 50, movable contact 54, of thermostatic switch 26, and conductors 55 and 41, switch 42 and conductor 43 to the supply conductor X.

A back contact 56 is provided on the thermostat 26 for governing the energization of coil 57 of solenoid 24 to cause retraction of the negative carbon in the event that it is moved too far forward for any reason while the arc is burning. If, for any reason, the end of the negative electrode is operating in a position which is too far forward, movable contact 54 will engage back contact 56 to close a circuit to energize coil 57 and thus cause a retraction of the negative carbon. This circuit extends from supply conductor Y, through conductor 33, contact element 34, conductors 35, 36 and 37, brush 31, contact strip 29, brush 51, conductors 52 and 58, solenoid coil 57, conductor 10, back contact 56, movable contact 54, conductors 55 and 41, switch 42 and conductor 43 to the supply conductor X. Thus it will be seen that the negative electrode arcing tip will be maintained in a position such as to cause the movable contact 54 of the thermostat 26 to be normally out of engagement with the stationary contacts 56 and 50, and as the negative electrode is consumed in the arc, contact will be made between movable contact 54 and front contact 50 to cause intermittent feed of the negative electrode towards the arc by energizing solenoid coil 49.

A relay 59 is provided for governing the operation of the system to strike an arc when the searchlight is first energized and the electrodes 11 and 19 are in contact with each other as shown in the drawings. The operation of this relay causes contact element 60 to open a circuit which comprises conductors 76 and 111, contact element 60 and conductors 36 and 101, and which normally shorts out the resistance 61 when the arc is in normal operation with contact element 60 in closed circuit position. The opening of this circuit renders the resistance 61 effective to limit the current through the electrodes while they are in contact and while the arc is being struck. Relay 59 is provided with an operating coil 62 and a holding coil 63. The operating coil is connected through a circuit which extends from supply conductor Y, through switch 64, conductors 65 and 66, coil 62, conductors 67 and 68, contact element 69, conductors 70 and 71, switch 72 and conductor 73 to supply conductor X.

The holding coil 63 of relay 59 is energized by the potential drop across resistance 61 and its current is limited by the adjustable resistance 74 which may be adjusted to cause the holding coil to release at the desired value of current in the arc circuit. This holding coil is energized through a circuit which includes resistance 61, conductors 36, 37 and 75, coil 63, resistance 74 and conductor 76 back to the other side of resistance 61.

The energization of electrodes 19 and 11 is governed by contact element 34 of relay 77 and contact element 78 of relay 79. Relay 77 is energized through a circuit which extends from supply conductor Y, through manual control switch 80, coil 81, contact element 82 of relay 59, conductors 83, 92 and 71, switch 72 and conductor 73 to the other supply conductor X.

The energization of relay 79 is controlled by switch 84 through a circuit extending from conductor Y, through switch 64, conductors 85 and 86, relay 79, conductor 87, contact element 88 of switch 84, conductors 89 and 71, switch 72 and conductor 73 to supply conductor X. A circuit which parallels the circuit through contact element 88, which is biased to open circuit position, is provided for maintaining the energization of relay 79 and is controlled by contacts 90 actuated by relay 79. This circuit includes conductor 87, conductor 91, contact element 90 and conductors 92 and 89.

Switch 84 also has contact element 93 which forms a circuit in parallel with contact element 69 of relay 77, which circuit includes conductors 68 and 94, contact element 93 and conductors 95 and 71.

The movement of the negative electrode away from the positive electrode in striking the arc is under the control of the coil 96 of the solenoid 24, which is energized by the potential drop across resistance 61 due to the current flowing through the electrodes while the electrodes are in contact at the beginning of the striking of the arc and while the arc is being struck until contact element 60 shorts out resistance 61. The circuit for coil 96 includes resistance 61, conductors 76 and 97, coil 96 and conductors 98 and 36 back to the other side of resistance 61.

If, for any reason, the electrodes are left in a position such that they are not in contact when the arc is shut off and the searchlight deenergized, it is necessary that the negative carbon be moved to the positive carbon before the arc can be struck again, and energy for actuating the motor 13 under these conditions is supplied through a circuit which extends from supply conductor Y, through contact element 64, conductor 65, resistance 99, back contact 100 of relay 77, conductors 101, 36, 37 and 102, motor 13, conductor 103, switch 104, conductors 105 and 106, contacts 78, conductor 107, coil 108 and conductor 109 to supply conductor X. Under these conditions the negative electrode is moved toward the positive electrode under control of coil 110 of solenoid 25 through a circuit which extends from supply conductor Y, contact element 64, conductor 65, resistance 99, contact element 100, conductors 101 and 36, contact element 112, conductor 113, coil 110, conductor 114, conductors 55 and 41, switch 42 and conductor 43 to supply conductor X. Coil 110 is so constructed as to have fewer ampere turns than coil 96 when these coils are connected in parallel.

In order to prevent the electrodes from burning back so far as to cause the heat from the arc to damage the holding mechanism for the electrodes, a protective circuit is provided for deenergizing the arc in the event that either electrode tip recedes to a predetermined position. This circuit is under control of the thermostatic switches 26 and 27 and comprises front contacts 115 and 116 of thermostatic switches 26 and 27, respectively, which complete a circuit to short out relay coil 79 and thus cause deenergization of the arc by opening contact element 78 of relay 79. This shorting circuit for coil 79 includes conductor 86 which is connected to relay 79, conductor 85, contact element 118, conductor 117, front contact 115 and/or 116, contact element 54 and/or 47, conductors 55 and/or conductor 48, conductor 41, switch 42, conductor 43, source X, conductor 73, switch 72, conductor 71, conductor 92, contact element 90 and conductor 91 to the other side of the relay 79.

A fan 119 driven by motor 120 is provided for ventilating the drum of the searchlight to remove the products of combustion from the arc and to keep the searchlight from overheating. This fan motor 120 is energized by a circuit which extends from supply conductor Y, conductor 121, motor 120, conductor 122, conductors 71, switch 72, and conductor 73 to the other supply conductor X.

The control circuits for placing the arc into operation are governed by the switch 72 which also controls the fan so that the fan will be in operation at all times when the arc is burning, to prevent accumulation of gas in the searchlight drum and overheating of the searchlight which might occur if the fan were separately controlled and the operator neglected to start the fan.

In order to prevent energization of the arc while the door of the searchlight is open, to thus avoid injury to an operator who might be working on the mechanism inside the searchlight drum, a circuit is provided for preventing energization of the relay 79 while the door of the searchlight is open. This circuit is under control of switch 64 which is so controlled by the positioning of the searchlight door as to be closed when the searchlight door is closed and open when the door is open. It will be seen that this switch controls the energization of relay 79 through circuits which have been hereinbefore described.

Relay 77 comprises operating coil 81 and holding coil 108. Holding coil 108 is energized by the current flowing through the arc, and its functioning and purpose will be described hereinafter.

In the operation of the device, the switch 72 is first closed to cause energization of the fan motor 120. The closure of switch 72 energizes relay 59 which closes its contact elements 82 and 112 and opens its contact element 60. The next step in the operation is the closure of switches 45, 42 and 104. Closure of switch 104 will energize the motor 13 through a circuit hereinbefore described.

Switches 84 and 80 are closed in the order named. The closure of switch 84 energizes relay 79 which closes its contact element 90 to establish the holding circuit hereinbefore described. When switch 80 is closed, operating coil 81 of relay 77 is energized to move contact elements 69 and 100 to open circuit position and contact element 34 to closed circuit position. In this stage of the operation it will be seen that the electrodes are energized, since the main electrode energizing circuits are closed by contact element 34 of relay 77 and contact element 78 of relay 79 and power is being fed to the electrodes through resistance element 61, since the contact element 60 of relay 59 is in the open circuit position and allows current to flow through resistance 61. The potential drop across the resistance 61 and the electrodes is also effective in the motor circuit which is in parallel circuit relation with these elements and causes motor 13 to rotate. The potential drop across resistance 61 is also effective to energize coil 96 of solenoid 24 and cause gears 21 and 22 to mesh and thus retract the negative electrode 19.

At the time that relay 77 was energized, the circuit of the operating coil 62 of relay 59 was deenergized by the movement of contact element 69 to open circuit position. The holding coil 63 of relay 59, however, is energized by the potential drop across resistance 61 and holds the relay contacts in the operated position until the negative electrode 19 is retracted sufficiently to reduce the current to an amount which will not be sufficient to cause the drop in resistance 61 which is necessary to supply sufficient potential to coil 63 to cause this coil to hold the contacts in operated position. The sensitivity of the holding coil may be adjusted by variable resistance 74 which is in series circuit relation with the coil 63. It will be noted that coil 110 of solenoid 25 is energized at the same time that coil 96 of solenoid 24 is energized, but since these coils are so designed and the circuit is so adjusted as to cause coil 96 to have greater strength than coil 110 under these circuit conditions, coil 96 will effect a retraction of the electrode as hereinbefore described.

After the arc has been drawn to sufficient length to cause the holding coil of relay 59 to allow the contacts of relay 59 to return to normal deenergized position, contact elements 60 will close the circuit shorting out resistance 61. This will eliminate the potential drop across resistance 61 and solenoid coil 96 will be deenergized. Solenoid coil 110 will be deenergized by the opening of contact element 112, and the operating coil 81 of relay 77 will be deenergized by the opening of contact element 82.

At this stage of the operation of the device the arc is burning, the movement of the negative electrode 19 is under control of solenoid coils 57 and 49 for retraction and advancing, respectively, and these coils are, in turn, controlled by the interrupter drum 28. It will be seen that so long as the negative electrode arcing tip is in a position too far advanced to cause heat rays from the electrode to actuate thermostatic switch 26, contact elements 54 and 56 thereof will be engaged and the retracting coil 57 of solenoid 24 will be intermittently energized through the interrupter 28 to cause intermittent retracting movements of negative electrode 19. When the negative electrode 19 is sufficiently retracted, the heat rays from the electrode tip will be impressed upon the thermostatic switch 26 to cause separation of its contact elements 54 and 56. As the negative electrode 19 is consumed in the arc, the hottest part of the electrode recedes and so effects thermostatic switch 26 as to cause the engagement of its contact elements 50 and 54, which will cause intermittent energization of the advancing coil 49 of solenoid 25 through a circuit which includes the interrupter 28, as hereinbefore described. In this manner, the arcing tip of the negative electrode will be moved to the desired position and will be maintained in that position by the automatic feeding of the electrode toward the arc at a rate which is governed by the rate of consumption of the electrode in the arc.

The feed of the positive electrode 11 to the arc is governed by a similar thermostatic switch 27 and feeding of this electrode takes place only after the arcing tip of the electrode has receded to such a position as to cause the heat from the electrode crater to so effect the thermostatic switch 27 as to cause separation of contact elements 32 and 47 which, in turn, removes the short circuit from the operating coil 16 of clutch 15 to permit intermittent feeding of the electrode at a rate which is governed by the position of brush 30 on the drum of the interrupter 28.

In the event that it is desired to feed the positive electrode intermittently without relying upon the thermostatic switch control, the intermittent feed switch 45 may be opened to remove the short circuit from coil 16.

Thus both electrodes are fed to the arc to compensate for the consumption of the electrodes in the arc and the electrode tips are maintained at predetermined positions, so that the length of the arc is kept constant.

If for any reason the mechanism should fail to move either or both of the electrodes, these electrodes might burn back to such a position as to cause damage to the electrode holders. To prevent such an occurrence, contact element 116 of thermostat switch 27 is so positioned that when the positive electrode tip has receded too far from its normal operating position excessive heat will cause the thermostatic switch to move contact elements 47 and 116 into engagement. This will establish a shunting circuit for the coil of relay 79 causing deenergization of coil of relay 79 and, in turn, deenergizing the electrodes by opening the circuit to the positive electrode at contact elements 78. In a like manner, contact element 115 is so positioned as to be engaged by contact element 54 when the arc tip of negative electrode 19 has receded to a predetermined undesirable point and the engagement of contact elements 54 and 115 will close a circuit which will short circuit the coil relay 79.

With the electrodes normally energized and while the arc is being maintained, the circuit to the negative electrode will be held closed by contact element 34 through the action of the current in the electrode circuit on the holding coil 108 of relay 77. If for any reason not under the control of the operator, the arc should be extinguished with the electrodes still energized, current would cease to flow through the electrodes, holding coil 108 would be deenergized causing contact elements 69 and 100 to close. In this position contact element 69 would close a circuit through the operating coil 62 of relay 59, extending from supply conductor X, through conductor 73, switch 72, conductors 71 and 70, contact element 69, conductors 68 and 67, coil 62, conductors 66 and 65 and switch 64 to supply conductor Y. The closure of contact element 100 establishes a substitute circuit to the motor 13 for the motor circuit which was interrupted by the opening of contact element 34. The energization of the operating coil 62 of relay 59 also closes contact element 112 to complete a circuit for the advancing coil 110 of solenoid 25 to cause the negative electrode to be advanced until it engages the positive electrode. Meanwhile the closure of contact element 82 of relay 59 energizes coil 81 of relay 77 which opens its contact elements 100 and 69 and closes its contact element 34. This will deenergize the operating coil 62 of relay 59 but holding coil 63 of relay 59 will hold the contacts of relay 59 in the operating position, since it will now have the potential drop across it which is caused by the heavy current flowing through resistance 61 while electrodes 11 and 19 are engaged.

As soon as the electrodes engage, the potential drop across resistance 61 will act upon coil 96 of solenoid 24 which, in turn, will overcome the pull of coil 110 of solenoid 25 and will cause retraction of the negative electrode to form the arc. This retraction will take place as hereinbefore described in connection with the initial starting of the arc until the current in the arc has dropped to where it is no longer great enough to maintain holding coil 63 energized sufficiently to hold the contacts of relay 59 in the energized position. Thus, it is seen that the arc will be automatically restruck if for any reason beyond the control of the operator the arc is broken.

If for any reason when it is desired to energize the searchlight, electrodes 11 and 19 are not in engagement, the closure of switches 72, 104, 84 and 80 will cause the negative electrode to move into engagement with the positive electrode and to strike the arc as just described in connection with the operation of re-forming the arc.

When it is desired to extinguish the arc and leave the electrodes in contact with each other, so that the arc may be struck quickly when the searchlight is re-energized, it is only necessary to open switch 72. The opening of this switch will open the operating circuit of relay 79 which opens its contact element 78 to interrupt the electrode circuit. This opening of the electrode circuit will cause deenergization of the holding coil 108 of relay 77 which will cause movement of negative electrode 19 into engagement with positive electrode 11, as hereinbefore described in connection with the operation of the apparatus to restrike the arc in the event that the arc becomes extinguished. In this position of engagement of electrodes 11 and 19, the motor will be stalled due to being in parallel with the electrodes and resistance 61 which is very small. If the electrodes are left in this position, when potential is again applied to supply lines X and Y, the motor will be energized and will hold the electrodes in a position to immediately strike the arc when switches 72, 104, 84 and 80, 42 and 45 are closed.

In Fig. 2, there is shown a modification of the positive electrode control described in connection with the system of Fig. 1. The apparatus of this modification is essentially the same as that shown in Fig. 1 and like reference characters have been applied to the corresponding parts. The thermostatic switch 27 is provided with an auxiliary front contact 32' so positioned as to be engaged by the movable contact element 47 after it has moved a predetermined amount. With this system of control the coil 16 of the feed clutch 15 will be energized through interrupter 28 to cause movement of electrode 11 only while movable contact element 47 is moving from engagement with contact element 32 to engagement with contact element 32' while the thermostatic switch 27 is being heated up by the heat from the tip of the positive electrode and during the movement of contact element 47 from engagement with contact element 32' to engagement with contact element 32 while thermostatic switch 27 is cooling off after the forward movement of its movable contact has permitted movement of the positive electrode toward the arc. This system has the advantage that delay in preheating of the thermostatic switch 27 and the time lag in cooling the switch will not cause excessive feeds of the positive electrode toward the arc. The thermostatic control of the feeding of the positive electrode to the arc may be made inoperative by the opening of switch 45, as described in connection with the operation of the system of Fig. 1. It will be noted that the spring 125 provides a resilient mounting for contact element 32' so that movable contact element 47 may continue to move, if necessary, to engagement with contact element 116 after first engaging contact element 32'.

The modification of positive electrode feed mechanism shown in Fig. 3 is designed to provide intermittent feed for the positive electrode at a rate which is substantially equal to the average rate of consumption of the electrode in the arc supplemented by an auxiliary feed under the control of a thermostatic switch to increase the rate of feed of the electrode when the arcing tip of the electrode recedes a predetermined amount. The main intermittent feed is controlled by a series circuit through the operating coil 16 and including the interrupter device 28. The auxiliary feed control is governed by the contact elements 128 and 129 of thermostatic switch 27 which cooperate with a series of conducting strips 131 on the drum of interrupter 28. This auxiliary control circuit is connected in parallel with the main control circuit and gives increased total time of energization of the operating coil 16 for each revolution of the drum 28.

The plurality of contact strips 131 are provided for the purpose of giving the coil 16 a series of short energizations for each revolution rather than a long energization in order to provide inching of the electrode toward the arc and to prevent too great a feeding of the electrode toward the arc, which might result from overtravel of the feeding mechanism if it were given long periods of energization. Brush 130 may be adjusted axially of the drum to vary the time interval of contact of brush 130 with contact strips 131, to thereby vary the intervals of energization of coil 16.

The protective circuit for shorting out relay 79 in the event that the arcing tip of the positive electrode recedes too far from normal position, is governed in this modification of the device by a circuit which includes conductors 117 and 55, which correspond to the like-numbered conductors in the device shown in Fig. 1, movable contact 47' which is actuated by the thermostatic switch 27 and fixed contact 116'. It will be noted that contact element 128 is resiliently mounted by spring 127 to permit further movement of contact element 47' into enegagement with the contact element 116'. The other apparatus and circuits shown in this figure perform the functions of the similarly-numbered elements of Fig. 1.

Thus it will be seen that we have provided a mechanism for controlling the movement of the positive and negative electrodes of an arc searchlight, so that the negative electrode will be moved into contact with the positive electrode when it is desired to take the searchlight out of operation so that the electrodes will be in position for quickly striking an arc when it is again desired to project a beam from the searchlight; for automatically restriking the arc by properly controlling the movement of the negative electrode in the event that the arc pulls out or is otherwise extinguished for any cause beyond the control of the operator; for automatically striking the arc when the searchlight is energized in the event that the electrodes are not in contact when it is desired to strike an arc; for automatically feeding the positive and negative electrodes to the arc to maintain the arcing tip of the electrode at a fixed position; for securing exact adjustment of the positive electrode by a sensitive feed mechanism which will prevent over-travel of the electrode in feeding it to the arc; for rendering the mechanism inoperative to strike an arc while the door of the searchlight is open to thus prevent injury to an operator who might be working on apparatus inside the searchlight drum with the door open; and for preventing operation of the searchlight without operating the exhaust fan to thus prevent damage to the searchlight by overheating.

In compliance with the requirements of the patent statutes, we have shown and described herein the preferred embodiments of our invention. It is understood, however, that the invention is not limited to the precise construction shown and described but is capable of modification by one skilled in the art, the embodiments herein shown being merely illustrative of the principles of our invention.

We claim as our invention:

1. In a light producing arcing device, opposing arc electrodes, an electrode feed control mechanism, supplemental electrode contact control means responsive to the deenergization of the arc for causing said electrode feed control mechanism to move said electrodes into engagement, automatic arc striking means responsive to the reenergization of the electrodes for causing said electrode feed control mechanism to move said electrodes out of engagement to reestablish the arc, and position maintaining means for causing said electrode feed control mechanism to maintain a predetermined arc length.

2. In an arc searchlight having arcing electrodes, an electrode feeding mechanism, automatic position maintaining means causing said feeding mechanism to maintain the arcing tip of an electrode in a predetermined position, and automatic circuit control means for rendering the arc inoperative when the arcing tip of said electrode reaches a predetermined position.

3. In an arc searchlight having arcing electrodes, an electrode feeding means including an electromagnetic device, a thermostatic switch, mounting means for so positioning said switch as to cause it to be affected by the heat rays from the arcing tip of an electrode when said arcing tip recedes to a predetermined position, said thermostatic switch having normally closed contact members which are opened when the arc tip recedes to said predetermined position, circuit control means whereby the opening of said contact members causes energization of said electromagnetic device, said thermostatic switch having normally open contact members which are closed when the heat rays from the arc tip affect the thermostatic switch a predetermined amount, and auxiliary control means responsive to the closure of said normally open contact members for rendering the arc inoperative.

4. In an arc searchlight having arcing electrodes, electromagnetic means for feeding an electrode to the arc, a thermal responsive switch so positioned as to be affected by the heat rays from the arcing tip of said electrode when said arcing tip recedes to a predetermined position, said switch having normally closed contact members which are opened when the arc tip recedes to said predetermined position, an energizing circuit for said electromagnetic means, circuit control means intermittently closing said circuit to said electromagnetic means for predetermined adjustable intervals of time, and auxiliary circuit means under control of said contact members of the thermal responsive switch rendering said electromagnetic means inoperative except when the contact members of the thermal responsive switch are in open circuit position.

5. In an arc searchlight having arcing electrodes, electromagnetic means for feeding an electrode to the arc, circuit control means intermittently energizing said electromagnetic means, and manual means for adjusting the length of the interval of each energization of said electromagnetic means to thereby vary the rate of feed of the electrode to the arc.

6. In an arc searchlight having arcing electrodes, electromagnetic means for feeding an electrode to said arc, circuit control means for intermittently energizing said electromagnetic means for predetermined adjustable time intervals, a thermal responsive switch responsive to the arc tip position, an auxiliary circuit means controlled by said switch for adding intervals of energization to the above-named intervals when the arc tip recedes to a predetermined position.

7. In an arc searchlight, arcing electrodes, a feeding means for each of said electrodes, automatic position maintaining means responsive to the recession of the arcing tip of one of said electrodes a predetermined amount from a predetermined position for causing said feeding means for said one electrode to feed said electrode to the arc, and automatic auxiliary position maintaining means responsive to the position of the other electrode tip for causing said feeding means for said other electrode to move the other electrode toward or away from the arc depending upon whether the arcing tip is displaced a predetermined amount away from or toward the arc from a predetermined position.

8. In an arc searchlight, arcing electrodes, a feeding means for each of said electrodes, automatic position maintaining means responsive to the recession of the arcing tip of one of said electrodes a predetermined amount from a predetermined position for causing said feeding means for said one electrode to feed said electrode to the arc, automatic auxiliary position maintaining means responsive to the position of the other electrode tip for causing said feeding means for said other electrode to move the other electrode toward or away from the arc depending upon whether the arcing tip is displaced a predetermined amount away from or toward the arc from a predetermined position, circuit control means for deenergizing the arc, and electrode contact control means responsive to the actuation of said circuit control means for causing said electrode feeding means to effect engagement of the electrodes with each other preparatory to re-striking the arc.

9. In an arc searchlight, arcing electrodes, a feeding means for each of said electrodes, automatic position maintaining means responsive to the recession of the arcing tip of one of said electrodes a predetermined amount from a predetermined position for causing said feeding means for said one electrode to feed said electrode to the arc, automatic auxiliary position maintaining means responsive to the position of the other electrode tip for causing said feeding means for said other electrode to move the other electrode toward or away from the arc depending upon whether the arcing tip is displaced a predetermined amount away from or toward the arc from a predetermined position, circuit control means for deenergizing the arc, electrode contact control means responsive to the actuation of said circuit control means for causing said electrode feeding means to effect engagement of the electrodes with each other preparatory to re-striking the arc, supplementary circuit control means for reenergizing said arc electrodes, and automatic arc striking means responsive to the reenergization of the electrodes for causing said electrode feeding mechanism to separate the electrodes and thus strike an arc.

10. In an arc searchlight, arcing electrodes, a feeding mechanism for each of said electrodes, automatic position maintaining means responsive to the recession of the arcing tip of one of said electrodes a predetermined amount from a predetermined position for causing said feeding mechanism for said one electrode to feed said electrode to the arc, automatic auxiliary position maintaining means responsive to the position of the other electrode tip for causing said feeding mechanism for said other electrode to move the other electrode toward or away from the arc depending upon whether the arcing tip is displaced a predetermined amount away from or toward the arc from a predetermined position, and circuit control means responsive to the recession of either of the arcing tips from its normal position a predetermined amount for deenergizing the arc.

11. In combination with an arc searchlight having arcing electrodes, automatic current control means for maintaining a constant predetermined current flow through the arc, electrode feeding means, and electrode position control means causing said electrode feeding means to maintain a predetermined arc length.

12. In a light producing arcing device having an arcing electrode and a feeding mechanism for the electrode, an electrode positioning control system for causing the electrode feeding mechanism to maintain the electrode at a predetermined position comprising, an electrode feed control means for causing said feeding mechanism to operate, a thermal responsive switch having fixed front and back contact elements and a movable contact element normally biased in contact with one of said fixed contact elements and movable from contact with said one fixed contact element to contact with the other contact element when the thermal responsive switch responds a predetermined amount, auxiliary means for causing the heat from the arcing heat zone to affect said thermal responsive switch when the electrode arcing tip recedes a predetermined amount, and automatic circuit control means whereby said electrode feed control means is rendered ineffective by the disengagement of said movable contact element with both of said fixed contact elements.

13. In an arc searchlight, a ventilating mechanism for the searchlight, a mechanism for striking the searchlight arc, and auxiliary means controlled by said ventilating mechanism for rendering said arc striking mechanism inoperative while said ventilating mechanism is inoperative.

14. In a lighting device, opposing arc electrodes, an electrode feed control mechanism for causing relative motion of the electrodes toward and away from each other, automatic electrode contact control means responsive to the deenergization of the arc for causing said electrode feed control mechanism to move said electrodes into engagement, automatic arc striking means responsive to the reenergization of the electrodes for causing said electrode feed control mechanism to move said electrodes out of engagement to reestablish the arc, and automatic position maintaining means for causing said electrode feed control mechanism to maintain a predetermined arc length and position.

15. In a light producing device having arcing electrodes, a normal arc feed control mechanism for the electrodes, supplemental electrode contact control means for causing said arc feed control mechanism to effect engagement of the electrodes when the arc is rendered inoperative, automatic arc striking and reset means responsive to energization of the electrodes while they are engaged causing said feed control mechanism to strike an arc, and position maintaining means causing said feed control mechanism to maintain the arcing tip of one of the electrodes in a predetermined position.

16. In a light producing device having arcing electrodes, a thermostatic device, mounting means so positioning the thermostatic device as to render it responsive to the position of an electrode arcing tip, said thermostatic device having first contact means which are normally closed when the position of the arcing tip is such as not to affect the thermostatic device, said thermostatic device having second contact means which are normally open but are closed when the thermostatic device is affected a predetermined amount, arc feed control means responsive to said first contact means for feeding the electrode when the arcing tip recedes sufficiently to cause the thermostatic device to open said first contact means, and circuit control means responsive to the closure of the second contact means for rendering the arc inoperative.

17. In combination with a constant current light producing device having arcing electrodes, a feed control mechanism for each of said electrodes, means responsive to the position of the arcing tip of one of the electrodes for causing its feed control mechanism to maintain the arcing tip of said one electrode in a predetermined position, and means responsive to the position of the arcing tip of the other electrode for causing its feed control mechanism to maintain its arcing tip in a predetermined position, thereby to maintain a predetermined arc length.

18. In combination with a constant current light producing device having arcing electrodes, a feed control mechanism for each of said electrodes, a first thermal switch responsive to the position of the arcing tip of one of said electrodes, means responsive to the operation of said first thermal switch for causing the feed control mechanism associated with said one electrode to maintain its arcing tip in a predetermined position, a second thermal switch responsive to the position of the arcing tip of the other electrode, and means responsive to the operation of said second thermal switch for causing the feed control mechanism associated with said other electrode to maintain its arcing tip in a predetermined position, whereby the arcing tips of the electrodes are maintained in a predetermined relation and a predetermined arc length is maintained.

19. In combination with a light producing device having arcing electrodes and a reflector, a feed control mechanism for each of said electrodes, means responsive to the position of the arcing tip of one of the electrodes for causing its feed control mechanism to maintain the arcing tip of said one electrode in a predetermined position with respect to the reflector, and means responsive to the position of the arcing tip of the other electrode for causing its feed control mechanism to maintain its arcing tip in a predetermined position thereby to maintain a predetermined arc length and position.

WILLIAM R. FARLEY.
ALFRED L. ATHERTON.
OTTO GONANO.